(No Model.)
R. H. RICHARDS, Jr.
CLAMP COLLAR.
No. 428,058. Patented May 13, 1890.
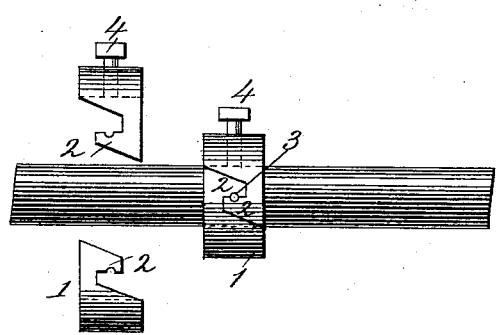
Attest:
F. H. Schott
J. W. Burroughs
Inventor:
Robert H. Richards Jr.
by M. T. E. Chandler
Atty

UNITED STATES PATENT OFFICE.

ROBERT H. RICHARDS, JR., OF ATLANTA, GEORGIA.

CLAMP-COLLAR.

SPECIFICATION forming part of Letters Patent No. 428,058, dated May 13, 1890.

Application filed June 14, 1889. Serial No. 314,300. (No model.)

*To all whom it may concern:*

Be it known that I, ROBERT H. RICHARDS, Jr., a citizen of the United States, and a resident of Atlanta, in the county of Fulton and State of Georgia, have invented certain new and useful Improvements in Clamp - Collars; and I do hereby declare the following to be a full and clear description of the invention, such as will enable others skilled in the art to which it appertains to make and use the same, reference being had to the accompanying drawing, and to figures of reference marked thereon, which forms a part of this specification.

This invention relates to an improvement in the means for securing the sections of a sectional clamp-collar, so as to obviate any tendency they may have to separate by a lateral movement.

The figure in the accompanying drawing shows a shaft having the collar attached, and it also shows the collar detached and the two parts separated.

Referring to the drawing by letter, A represents a split collar having means to provide against lateral motion of itself on a shaft and shows the device so applied. As the working strain on this collar is lateral, the two parts will have a tendency to separate. To prevent this separation the inner sides of the interlocking projections 2 2 are provided with semicircular recesses. When the two parts are brought together, they form a hole for the reception of the screw or pin 3. This screw or pin when in place gives a shearing stress to any lateral movement of the parts of the collar. When the two parts are placed on the shaft and brought together for adjustment, the pin or screw 3 is forced in the recess formed by the semicircular recesses formed in the inner sides of the projections. The whole is then fastened on the shaft by the set-screw 4, which passes directly through one of the parts to the shaft. The turning down of this screw brings the engaging surfaces of the two different parts firmly together by the radial force created.

Having thus described my invention, what I claim, and desire to secure by Letters Patent, is—

A collar composed of two pieces having recesses and interlocking projections, a screw so arranged in the recesses in said pieces as to give a shearing stress to any lateral movement of the pieces, and the set-screw for securing the collar to the shaft, substantially as described.

In testimony whereof I hereunto affix my signature in presence of two witnesses.

ROBERT H. RICHARDS, JR.

Witnesses:
A. P. WOOD,
B. F. RICHWOOD.